United States Patent
Stauder et al.

(10) Patent No.: US 9,024,962 B2
(45) Date of Patent: May 5, 2015

(54) METHOD FOR ADJUSTING THE SETTINGS OF A REPRODUCTION COLOR DEVICE

(75) Inventors: Jurgen Stauder, Montreuil sur Ille (FR); Patrick Morvan, Laille (FR); Bongsun Lee, Cupertino, CA (US)

(73) Assignee: Thomson Licensing, Issy-les-Moulineaux (FR)

( * ) Notice: Subject to any disclaimer, the term of this patent is extended or adjusted under 35 U.S.C. 154(b) by 1001 days.

(21) Appl. No.: 12/735,748

(22) PCT Filed: Feb. 11, 2009

(86) PCT No.: PCT/EP2009/051564
§ 371 (c)(1),
(2), (4) Date: Aug. 13, 2010

(87) PCT Pub. No.: WO2009/101104
PCT Pub. Date: Aug. 20, 2009

(65) Prior Publication Data
US 2010/0309231 A1 Dec. 9, 2010

(30) Foreign Application Priority Data
Feb. 15, 2008 (EP) .................................... 08300096

(51) Int. Cl.
*G09G 5/02* (2006.01)
*G09G 5/10* (2006.01)
(Continued)

(52) U.S. Cl.
CPC .................................. *H04N 1/6033* (2013.01)

(58) Field of Classification Search
CPC ...... G03F 3/00; H04N 1/6058; H04N 1/6088; H04N 5/74; H04N 1/2338; H04N 1/6097; H04N 1/00222; H04N 1/2315; H04N 1/2323; H04N 1/2361; H04N 9/3182; H04N 9/68; H04N 1/6027; H04N 1/60; G09G 2320/0693; G09G 2320/0242; G09G 3/2003; G06T 7/408
USPC .................................... 345/593, 690; 382/274
See application file for complete search history.

(56) References Cited

U.S. PATENT DOCUMENTS 3,877,797 A 4/1975 Thornton, Jr.
5,481,380 A 1/1996 Bestmann
(Continued)

FOREIGN PATENT DOCUMENTS

CA 2431866 7/2002
DE 4309802 9/1994
(Continued)

OTHER PUBLICATIONS

Okumura et al., "Nearly Lossless Compression of Color Still Images and Its Performance Evaluation", Electronics and Communications in Japan, Part 1, vol. 79, No. 5, 1996, pp. 38-55.
(Continued)

Primary Examiner — Kee M Tung
Assistant Examiner — Haixia Du
(74) Attorney, Agent, or Firm — Myers Wolin LLC

(57) ABSTRACT

According to this method, successive iterations are launched according to the following steps:—1) the reproduction color device is set according to settings,—2) reference input colors are calibrated putting calibrated input colors,—4) reproduction quality rating value are calculated,—5) a reproduction quality criterion is applied to decide or not to go for another iteration with different settings. This method allows the optimization of the settings according to color preferences.

18 Claims, 3 Drawing Sheets

(51) Int. Cl.
*G06K 9/40* (2006.01)
*H04N 1/60* (2006.01)

(56) References Cited

U.S. PATENT DOCUMENTS

| | | | | |
|---|---|---|---|---|
| 5,619,427 | A * | 4/1997 | Ohkubo | 358/523 |
| 5,809,165 | A | 9/1998 | Massen | |
| 6,027,201 | A * | 2/2000 | Edge | 347/19 |
| 6,330,078 | B1 | 12/2001 | Wang | |
| 6,868,190 | B1 * | 3/2005 | Morton | 382/278 |
| 7,551,797 | B2 * | 6/2009 | Dorrell et al. | 382/274 |
| 2002/0122044 | A1 | 9/2002 | Deering | |
| 2003/0085926 | A1 | 5/2003 | Heynderickx et al. | |
| 2003/0193564 | A1 | 10/2003 | Jenkins | |
| 2003/0214661 | A1 | 11/2003 | Kondo | |
| 2004/0190770 | A1 | 9/2004 | Spaulding et al. | |
| 2004/0257599 | A1 | 12/2004 | Chi et al. | |
| 2005/0093923 | A1 | 5/2005 | Busch et al. | |
| 2005/0163370 | A1 | 7/2005 | Minakuti et al. | |
| 2005/0248781 | A1 | 11/2005 | Tin | |
| 2006/0227386 | A1 | 10/2006 | Nuuja et al. | |

FOREIGN PATENT DOCUMENTS

| | | |
|---|---|---|
| DE | 4335143 | 4/1995 |
| EP | 0619555 | 10/1994 |
| EP | 0625847 | 11/1994 |
| EP | 0750419 | 12/1996 |
| EP | 1014685 | 6/2000 |
| EP | 1139656 | 10/2001 |
| EP | 1164778 | 12/2001 |
| EP | 1294178 | 3/2003 |
| EP | 1558020 | 7/2005 |
| EP | 1587049 | 10/2005 |
| EP | 1845703 | 10/2007 |
| JP | 62185127 | 8/1987 |
| JP | 651735 | 2/1994 |
| JP | 2005176032 | 6/2005 |
| JP | 2005178180 | 7/2005 |
| TW | 225362 | 12/2004 |
| WO | WO03036949 | 5/2003 |
| WO | WO2005043889 | 5/2005 |
| WO | WO2005125176 | 12/2005 |
| WO | WO2006112996 | 10/2006 |

OTHER PUBLICATIONS

Chang et al., "Model-reference color reproduction for video system based on back-propagation networks", Proceedings of the SPIE—The International Society for Optical Engineering, vol. 2170, pp. 182-190, Apr. 15, 1994.

Halstead et al., "Lighting Research and Technology", Lighting Research and Technology, vol. 3, No. 2, pp. 99-124, Jan. 1, 1971.

* cited by examiner

Fig.1 – PRIOR ART

METHOD FOR ADJUSTING THE SETTINGS OF A REPRODUCTION COLOR DEVICE

This application claims the benefit, under 35 U.S.C. §365 of International Application PCT/EP2009/051564, filed Feb. 11, 2009, which was published in accordance with PCT Article 21(2) on Aug. 20, 2009 in English and which claims the benefit of European patent application No. 08300096.8, filed Feb. 15, 2008.

The invention relates to a method for adjusting the settings of a reproduction color device in order to get the reproduction of at least one image by this reproduction color device according to a predetermined preferred look, to predetermined color preference, to predetermined reproduction quality ratings, and to a reproduction quality criterion applicable to said reproduction quality ratings.

Various applications need today color devices that reproduce colors, i.e. that transform input colors generally expressed in an RGB color space into output colors that can be measured as "absolute colors", for instance in a XYZ visual color space. These color devices can be display devices such as digital projectors, digital direct view devices such as CRT, LCD or Plasma Display Panels (PDP), or printing devices able to print paper or film, or any other device generating colors when fed with image data. Image data comprise "basic" or reference input colors that are built such that, when they are fed at the input of a reference color device, the output colors that are provided by this reference color device reproduce correctly the images.

In order to ensure colors to be reproduced on any given reproduction color device as on the so-called reference color device, i.e. with a given "image reference look", this reproduction color device need to be calibrated according to this reference color device. Ideally, when feeding input color values into a calibrated reproduction color device, the same measurable colors are reproduced, or the same appearing colors are reproduced as would be reproduced on the reference color device.

Any color device with its specific settings can be characterized by its correspondent device forward transform which may be represented by a Look up Tables (LUT) or by a parametric function, or by a combination of both. The forward transform is adapted to transform any input color values to the correspondent output color values that would be actually generated by the color device if these input color values were inputted at the entry of this color device. To any device forward transform, corresponds a device inverse transform that is adapted to transform any output color values to the correspondent input color values that have to be inputted to the color device to generate actually these output color values.

In more general we can say that the reference device forward transform characterizing a reference color device represents an image reference look that illustrates how image data represented by reference input colors should be reproduced. Such an "image reference look" can address characteristics of color reproduction such as contrast, saturation, hue and tone reproduction of image to reproduce, or, more generally, any characteristics of appearing color.

Calibration of a reproduction color device with its actual settings is generally achieved by a color management workflow as illustrated on FIG. 1. If this reproduction color device 12 is characterized by its reproduction device inverse transform 14, the calibration process of reference input colors is as follows: before being inputted at the entrance of this color device 12, these reference input colors are transformed successively through the reference device forward transform 15 and the reproduction device inverse transform 14. The forward reference device transform outputs absolute (or device-independent) color values representing the colors as they would have been generated if the reference input colors had been fed into the reference color device. Absolute color values can be represented—for example—in the CIE XYZ space or the CIE L*a*b* space. Then, the reproduction device inverse transform generates reproduction device input colors aimed to the reproduction color device in a way that the reproduction color device generates colors corresponding as best as possible to the absolute color values representing the colors as they would have been generated if the reference input colors had been fed into the reference display device. In this way, images are reproduced as close as possible to the way the reference color device display or print images.

Such a calibration process is suggested in the document US2004/257599 (see for instance claim 7). This kind of calibration is called colorimetric color reproduction, and the framework is called a color management framework. The framework may also include color appearance phenomena according to the CIE. In this case, the absolute color values are represented in a psycho-visual color space such as the CIECAM-02 JCh space. In this case, the calibration is called appearance-based color reproduction. Other means can be used to calibrate displays.

Reproduction color devices have usually device settings that can be chosen by the user. In case of a professional video monitor, these device settings may be brightness and contrast. In other cases, saturation, image enhancement or more advanced functionalities such as noise suppression may be also available as device settings. In case of printing devices, settings may include photochemical parameters. Those settings are kept constant when the color device is calibrated. Any time the settings are changed, a new device forward transform and a new device inverse transform characterize the color device, and a new calibration process must be performed.

Using so-called reference input colors to represent images in connection with a given reference color device, the generation of images as close as possible to images that would have been displayed or printed by the so-called reference color device requires the optimization of the settings of the reproduction color device that is used to generate these images. As a matter of fact, even if this reproduction color device is calibrated, when its settings are not chosen in a way appropriate for the generation of images, the quality of the generated images can be very poor. For example, dark image regions may be clipped, image regions of high luminance or strong contribution of one of the primary colors of the color device may be saturated or changed in hue.

Such strange behavior of color devices can be compensated by device calibration up to the effect of discrete representation of the input colors. After calibration as disclosed above by reference device forward transform and reproduction device inverse transform with given settings of the reproduction color device, the input colors are quantized depending on the bitdepth of the reproduction color device. In case of inappropriate reproduction device settings, quantization effects will be visible. In case of clipping in darks, quantization will be visible in darks. In case of saturation for strong input colors, quantization will be visible for small original or reference colors of the image data.

The Cinespace product from Rising Sun proposes a combined calibration and characterization process for Personnal Computers (PC) considering display settings that is a solution to the above problem of the optimization of the settings of a reproduction color device. This process runs in three steps. First, a test pattern image is displayed and the user is asked to set display settings in a way that certain transitions in the test image between regions of different color or luminance become either visible or invisible in order to avoid too strong or too weak saturation and clipping effects. In a second step, the Cinespace product displays and measures a set of color values. In several iterations, the user is asked to change the settings until the system judges the measured colors to be visible in an optimal way. In the third step, the final reproduction display inverse transform is stored on the hard disc of a PC. This allows the user to set up a color management pathway such as shown in FIG. 1. Unfortunately, the Cinespace system does not take into account an explicitly given image reference look. The system is not able to adapt to a required image reference look or to be used to different image reference looks. The system does not take into account any reference display device defining a "reference look". The system is not able to ensure minimal quantization effects when the display is calibrated with respect to an image reference look.

In the field of printers as reproduction color devices, the document WO2005/043889 discloses the production of a color conversion profile that would adequately convert input colors into corresponding amounts of inks of plural colors. As there are generally more than three different colors of inks, a given amount of inks that produces visual characteristics under given viewing conditions would generally produce different visual characteristics under other viewing conditions. The aim of this document is, for each type of visual color to produce or for each cell of the CIELAB color space (see embodiment 3 and FIG. 12), to set an amount of inks that will produce visual characteristics as close as possible one from another under different viewing conditions. The method does not take into account any reference printer device defining a "reference look". The method does not calibrate the reproduction printer device onto a reference printer device.

The document US2003/085926 discloses a method of adjusting display device settings for an optimized reproduction of a main picture generated by a display device and dependent on user preference, wherein a choice of options for a value or combination of values for the settings is made available for selection by a user of the reproduction display device, and the selected option is adopted as the new display settings defining the optimized reproduction, i.e. the "look" of the main picture, upon confirmation by the user. A sample image, which is specifically adapted for displaying the effects of different values of the settings and defined by the selected option, is displayed on the screen before confirmation.

The document U.S. Pat. No. 6,868,190 discloses a process for transforming input/output colors of an image into other input/output colors in order to provide a desired image look comprising:

defining desired values for at least two image look parameters associated with the desired image look;

sensing the values of the defined image look parameters for the colors of a source image;

and modifying the colors of this source image to provide new colors of a modified image with at least one image look parameter value closer to the defined image look parameter value associated with the desired image look.

This Process May Further Include:

verifying whether the image look parameter values of the colors of the modified image provide a desired image look, for instance when it is reproduced by a reproduction color display device, and further modifying again the colors of this image to provide colors of another modified image with at least one image look parameter value closer to the defined image look parameter value associated with the desired image look in response to the verifying step.

The above process may be iterative, according to a so-called quality process. Once the colors of an image are processed as explained above, the results of the processing are verified for a specific "look" and the accuracy of the "look" with respect to the desired "look" is communicated as a quality assessment that is used to identify the range of applicability of the image data. If this quality assessment is considered as not sufficient for the desired "look", it may be necessary to repeat the above process.

In this document, a given "image look" may be characterized by the values or characteristics or parameters of image data that influence (or may influence) the reproduction though not the content of the image. Thus in general, any scene of images may be given any "look" and any "look" may be applied to a scene of images. A "look" is also (within system tolerances) deterministic, where as a scene (especially an outdoor scene) is variable depending. The processes (including optical, chemical, physical or electronic) that are applied to an image or scene determine a certain style of color reproduction or a "look". This includes, for scenes that are artificially lit, the type of lighting that is used. The same basic image data may be used for different distribution and viewing situations of this image, and, for each situation, a different "look" of this same image may be required to achieve the best level of acceptance or artistic intent. Examples of such distribution "looks" include NTSC Video, PAL Video, HDTV, DVD or a specific release print film type, and may be specific to a viewing situation like a theater. "Looks" may also be characterized by source and image intent—for example a cartoon "look", or early film "look". Looks may also be defined in terms of a particular color gamut or defined, as stated above, by a forward reference display transform.

In this document, examples of possible desired "looks" which may be defined in terms of desired image look parameters include: Standard reference looks for archival purposes; Specific "look" associated with specific origination film type and/or print film type and associated processing; A "look" associated in addition with a specific lens type or lens effect; A video "look"; An HDTV "look"; Computer graphics generated "look"; A cartoon "look"; A "look" associated with a specific lighting effect; A theme "look" corresponding to a specific commercial "look"; A specific black and white "look" such as an Ansel "look"; A specific color "look" including color temperature or color gamut, to mention a few.

Among the image look parameters that may characterize an image look, this document U.S. Pat. No. 6,868,190 mentions: Contrast, Tone Scale, Sensor color gamut-including dynamic range, Display color gamut-including dynamic range, Color mapping from scene to screen, System Acutance, edge profile, System Grain characteristics, System Noise-Power spectrum, System Steadiness, Display Flutter, Display pixel placement, Refresh rate, Viewing environment, Amplitude, Amplitude Quantization, Modulation Transfer Function and so on. Generally, the value of "look" Parameters varies as function of signal amplitude and color and often interact so that changing one affects others. Look parameters may be for instance determined:

experimentally by varying the look parameters and applying the parameters through the modification process, analytically by parameters based on an analysis of the actual situation, for example the parameters associated with a hazy look may be determined by actual analysis of atmospheric haze, by measurement of the characteristics of images or image data which are deemed to have the desired look.

In this document, selection of a desired image look may be performed as follows:

(a) Generation of a sample of images of specific looks having defined "image look parameters" associated therewith and choice of the desired "look" corresponding to specific values of these image look parameters. Test images may be created and then used to monitor specific "image look parameters".

(b) Direct specification of image look parameters in the areas of, e.g., sharpness, grain, tone scale, local contrast, color saturation and whether these vary in scene dependent way. Then provide values of metrics that show how well these "look" goals have been met.

The extent to which an "image look" may be achieved from a specific source image data is determined in part to the extent to which the information required by the "look" is available in the source image data. In many cases, image content already lost cannot be recovered however advanced algorithms including algorithms adaptive to edge characteristics, algorithms which remove jitter and unsteadiness, motion tracking, temporal averaging algorithms, scratch removal, noise removal and the like provide tools where image recovery and salvage makes it possible to achieve "look" transformation from source image data.

The object of the invention is to avoid the aforementioned drawbacks, by proposing a new method for adjusting the settings of a reproduction color device.

For this purpose, the subject of the invention is a method for adjusting the user settings of a reproduction color device in order to get the reproduction of at least one image by this reproduction color device according to a predetermined reference color device representing a so-called predetermined "preferred look", according to a predetermined color preference adapted to select colors within a predetermined set of colors, according to a predetermined reproduction quality rating method adapted to provide a set of at least one reproduction quality rating value representing the quality of reproduction of the at least one image by said reproduction color device, and according to a predetermined reproduction quality criterion applicable to a set of reproduction quality rating values provided by said predetermined reproduction quality rating method, method in which, after an initialization step in which a first set of reproduction device settings is generated and a first set of reference input colors is generated by applying the predetermined color preference, successive iterations are launched according to the following steps:

1) setting said reproduction color device according to the last set of reproduction device settings that has been generated, 2) calibrating the reference input colors of the last set that has been generated into a new set of reproduction input colors, said calibrating being performed according to characteristics of the predetermined reference color device and according to characteristics of the reproduction color device that has been set with said last set of reproduction display settings, 3) testing said reproduction color device by inputting said new set of reproduction input colors and by measuring a new set of reproduction output colors generated by said reproduction color device responsive to these reproduction input colors, 4) applying said predetermined reproduction quality rating method(s) on said new set of reproduction output colors in order to provide a new set of reproduction quality rating values, 5) applying said predetermined reproduction quality criterion on at least the new set of reproduction quality rating values that has been provided such that: if the reproduction quality criterion is not met, a new set of reproduction device settings is generated, and another similar iteration is launched, or, if the reproduction quality criterion is met, the last or the penultimate set of reproduction device settings is used to set said reproduction color device.

The last or the penultimate set of reproduction device settings that is obtained is considered as the optimized set of reproduction device user settings that allow the best reproduction of the at least one image by the reproduction color device, according to the predetermined preferred look, to the predetermined color preferences, to the predetermined reproduction quality rating methods, and to the predetermined reproduction quality criterion.

The measurement of the reproduction output colors is performed in a manner known per se, using for instance standard colorimeters.

Preferably, before launching any new iteration, a new set of reference input colors is generated, i.e. not only a new set of reproduction device settings is generated. Preferably, any new set of reproduction device settings that is generated before launching a new iteration is a subset of the set of reproduction device settings of the previous iteration.

Preferably:

said characteristics of the reference color device is a reference device forward transform that is able to transform any reference input color of said reference color device into a reference output color that would be generated by said reference color device responsive to this reference input color, said characteristics of the reproduction color device is a reproduction device inverse transform that is able to transform any reproduction output color of said reproduction color device into a reproduction input color, whereas said reproduction output color would be generated by said reproduction color device responsive to this reproduction input color, said calibration of reference input colors of the last set is performed by applying the reference device forward transform characterizing said reference color device to said reference input colors then providing reference output colors, then applying the reproduction device inverse transform characterizing said reproduction display device to said reference output colors, then providing said reproduction input colors.

Preferably, the predetermined color preference is defined as a set of at least one rule of selection of colors within said predetermined set of colors. Preferably, at least one rule of selection is defined as selecting color having a probability above a predetermined probability threshold in the at least one image to reproduce. Preferably, the at least one rule of selection is defined in relationship with a specific application of the reproduction, for instance an application related to mobile display devices or an application related to cinema projection.

Preferably, the predetermined reproduction quality rating method is adapted to evaluate the quality of reproduction of said reproduction color device from any set of measured reproduction output colors that is obtained at the end of each iteration. This method is adapted to provide a set of reproduction quality rating values from any set of measured reproduction output colors, such data representing the quality of reproduction of the reproduction color device.

Preferably, said predetermined reproduction quality rating method comprises the calculation of a distance or difference between the set of measured reproduction output colors that is obtained at the end of an iteration and the corresponding set of reference output colors that has been obtained during the calibration step of this iteration. Such a reproduction quality rating method is illustrated on FIG. 3: see "rating example 1".

The quality rating value that is provided using this method is notably defined as the inverse of the color difference between the two sets. Since both sets of colors contain device independent colors, this reproduction quality rating method can be advantageously used in the framework of the invention in order to adjust the user settings of any type of reproduction color device using any type of preferred look, i.e. any type of reference color device. In order to calculate the difference, both sets of colors are preferably transformed into perceptual color space coordinates that reflect perceptual attributes such as hue, saturation and lightness. The quality rating value is then based on the inverse of three partial differences in hue, saturation and lightness, each calculated of the sets of colors. The final rating value is the inverse of the weighted sum of these differences. Typical weights can be 0.5, 0.2, 0.3. Other weights are possible, for example equal weights or weights being 1 or 0. Other color space coordinates are possible to calculate the rating value, for example CIEXYZ or CIEuv color spaces. Advantageously, such a reproduction quality rating method allows the evaluation of the preservation of contrast, hue and saturation.

Preferably, said predetermined reproduction quality rating method of a set of measured reproduction output colors comprises the calculation of the variance, or of a parameter close to the variance, of the measured reproduction output colors of said set that correspond to reproduction input colors that are sufficiently close to each other. Such a reproduction quality rating method is illustrated on FIG. 3: see "rating example 2". Reproduction input colors are considered as sufficiently close to each other if the variance of the subset formed by these reproduction input colors unequals zero but is smaller than a predetermined reproduction input color variance threshold. Advantageously, such a reproduction quality rating method allows the prevention from clipping, color compression, flattening.

The quality rating method of a set of measured reproduction output colors may be for instance defined as the calculation of an averaged neighborhood difference within this set, calculated as follows:

for each 8-neighboring reproduction output colors within said set, the difference of each of these 8 output colors with the output color corresponding to the center of this neighborhood is calculated;

all eight differences are averaged resulting into an averaged neighborhood difference dedicated to the center output color;

all averaged neighborhood differences are themselves averaged on the whole set of reproduction output colors, resulting into the average reference output color difference of said set representing the reproduction quality rating value of the set of reproduction output colors.

Advantageously, the predetermined reproduction quality rating method is adapted to provide a set of reproduction quality rating values representative of the preservation of contrast, hue and saturation of a set of reproduction output colors, and/or representative of the prevention from clipping, color compression, flattening or quantization of a set of reproduction output colors.

Said reproduction quality criterion (or criteria) is adapted to be applicable to the set of reproduction quality rating values that is obtained by the application of the predetermined reproduction quality rating method such that, when the reproduction quality criterion (or criteria) is met, the quality of the reproduction of the at least one image is considered as good enough. Preferably, said reproduction quality criterion is defined as being met when the difference between the set of quality rating values that have been calculated at the end of a given iteration and the set of quality rating values that have been calculated at the end of a previous iteration is inferior to a predetermined threshold.

Another subject of the invention is also a system for adjusting the settings of a reproduction color device that is able to implement the method according to the invention.

The invention will be more clearly understood on reading the description which follows, given by way of non-limiting example and with reference to the appended figures in which:

FIG. 1, already mentioned, illustrates a calibration workflow of a reproduction color device according to the prior art;

It will thus be appreciated that those skilled in the art will be able to devise various arrangements of the description below, that, although not explicitly described or shown herein, embody the present principles of the invention and are included within its spirit and scope. All statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various features embodying the invention may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Figure 1:
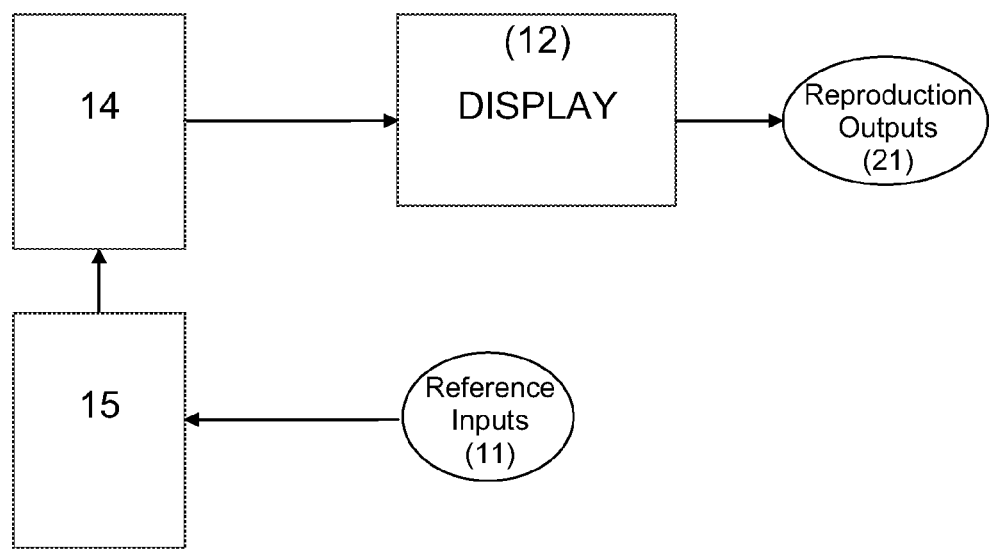
Figure 2:
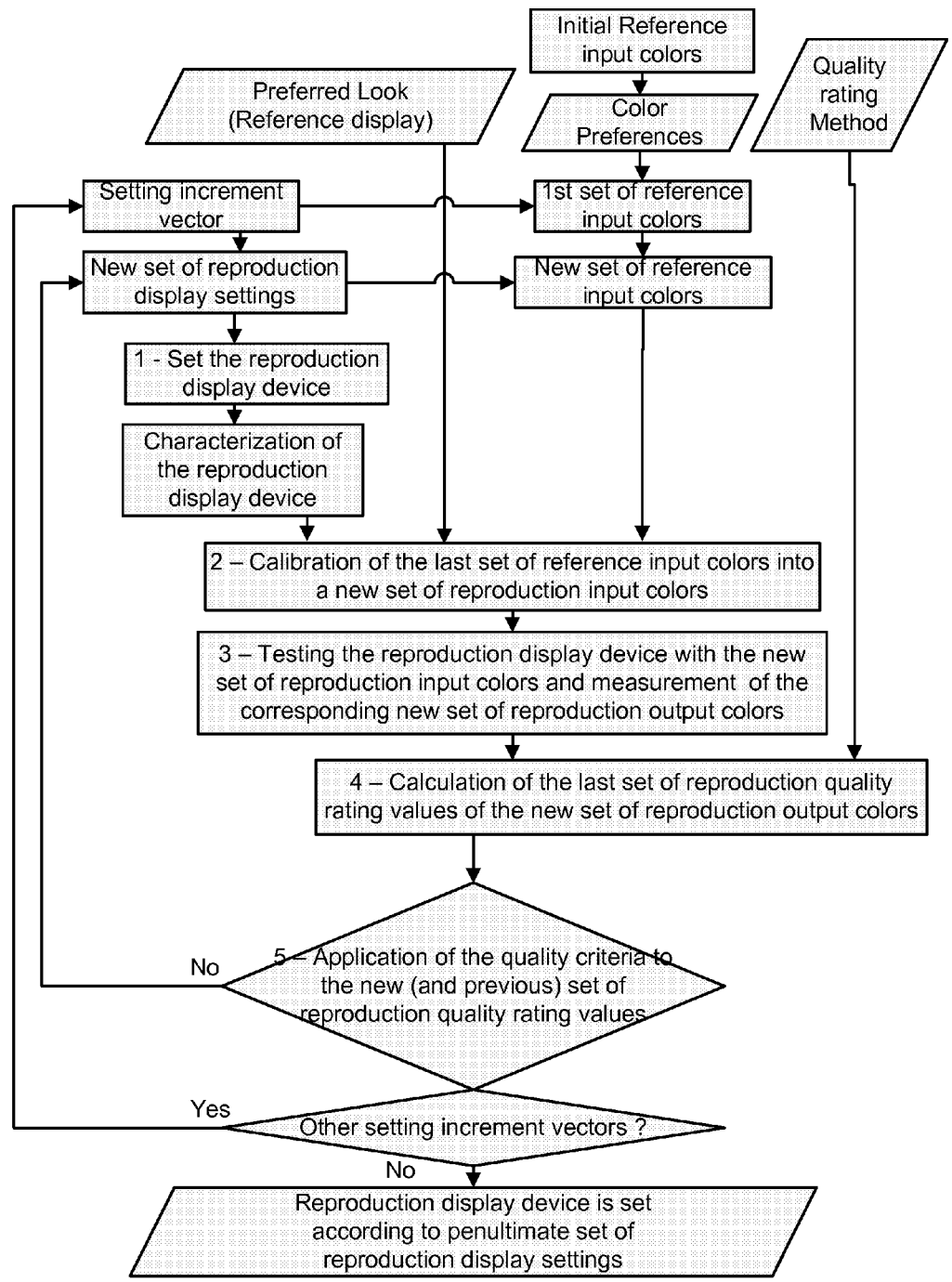
FIG. 2 illustrates a detailed functional flowchart of the method for adjusting the settings of a reproduction color device according to a main embodiment of the invention.
Figure 3:
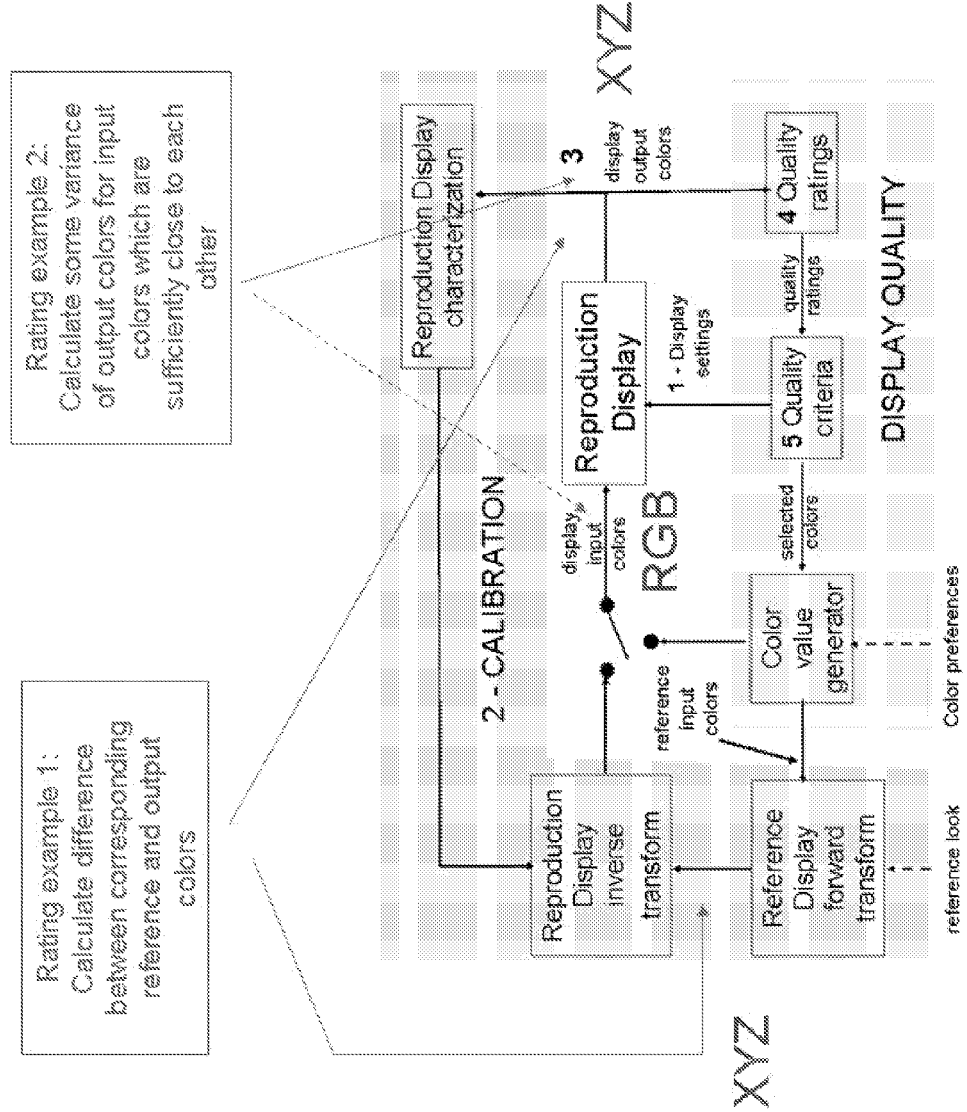
FIG. 3 illustrates in a different way the flowchart of FIG. 2.

A main embodiment of the method of adjusting the settings of a reproduction color device will now be described in reference to the flowchart of FIGS. 2 and 3.

The reproduction color device is a usual three primary display device taking RGB values as reproduction input colors, and having three following user settings: "luminance", "contrast" and "saturation". These user settings may be given setting values $S_L$, $S_C$, $S_S$, respectively, which are in the interval [0, 100]. Each set of three given user settings of this reproduction display device can be represented in a 3D setting space by a point having these three settings as coordinates. Each change of user settings can be represented as a setting increment vector in the setting space, as disclosed with more detail below. A set of setting increment vectors is predetermined with a first set $\Delta S_L$, $\Delta S_C$, $\Delta S_S$, a second set $\Delta S'_L$, $\Delta S'_C$, $\Delta S'_S$, and so on. Any setting increment vector corresponds to a predetermined step into a predetermined direction in the user setting space.

The method of adjusting the user settings of this reproduction display device will now be described in order to get a reproduction of at least one image according to a preferred look, to color preferences, to reproduction quality rating methods, and to a reproduction quality criterion.

The preferred look is defined by the characteristics of a reference color device, that may be real or virtual. These characteristics are provided in this implementation by the forward transform of the reference color device, being here a mathematical model. This transform is able to transform reference input colors into reference output colors that should be provided by the reference color device if these reference input colors are used to control said reference color device. This transform can be realized by known methods such as a parametric curve, splines interpolation or tetrahedral interpolation. The input of this transform accepts color values in a fixed bitdepth, that is assumed to be M.

Color preferences are defined as a set of at least one rule of selection of colors within the colors that are comprised in the at least one image to reproduce. The user settings of the reproduction display device can be optimized notably for the reproduction of a specific image, or a specific group of images, or a specific video sequence. The at least one rule of selection is defined for instance in relationship with a specific application of the reproduction. For example, when preparing content to be distributed for low-cost reproduction display devices (such as mobile phones), one rule of selection defining the color preferences is adapted to select mid-tones of the image(s) to reproduce, because such tones usually show the most important part of the image content for such reproduction display devices. When preparing content for cinema projection, one rule of selection defining the color preferences is adapted to select dark tones of the image(s) to reproduce, because such tones are also important for reproduction display devices as cinema projectors. In this embodiment, only one rule of selection of color is used which is defined according to the probability of this color within the colors that are comprised in the image(s) to reproduce and according to a predetermined minimum threshold of probability. Here, the probability of a color is considered as asserting the importance of this color for the reproduction. Normalized histograms can be used for this purpose.

In the specific non-limiting embodiment of the invention, only one reproduction quality rating method is used for each set of reproduction output colors that is obtained. This reproduction quality rating method is based on the calculation of an averaged neighborhood difference within this set, calculated as follows. For each 8-neighboring reproduction output colors within a set of reproduction output colors to quality rate, the difference of each of these 8 output colors with the output color corresponding to the center of this neighborhood is calculated. All eight differences are averaged resulting into an averaged neighborhood difference dedicated to a center output color. All averaged neighborhood differences are averaged on the whole set of reproduction output colors, resulting into an average reproduction output color difference that is considered as a reproduction quality rating value for this set of reproduction output colors.

In the specific non-limiting embodiment of the invention, a quality criterion is defined according a comparison between the quality rating value that is calculated at the end of an iteration of the process of adjusting the user settings of the reproduction display device and the quality rating value, possibly updated, that has been obtained at the end of a previous iteration of this process. More details are given concerning the definition of this quality criterion in the course of the description below. In this specific embodiment, this quality criterion may also determine the generation of the sets of reproduction device settings as disclosed hereinafter.

Having defined the preferred look in reference to a reference color device, having defined color preferences in reference to image(s) to reproduce and/or to this reference color device, having defined a reproduction quality rating method providing a reproduction quality rating value, and having defined a reproduction quality criterion to apply to the reproduction quality rating values that are obtained, the method of adjusting the user settings of the reproduction display device is generally performed in several iterations, as follows.

A first iteration for the optimization of the user settings of this reproduction display device is launched after the following initializing step comprising the generation of a first set of reproduction device settings and the generation of a first set of reference input colors as follows.

Firstly, a first set of reproduction device settings $S_{L1}$, $S_{C1}$, $S_{S1}$ is generated. Default user settings that are proposed by the manufacturer of this reproduction display device may be chosen as this first set of reproduction device settings.

Secondly, in a manner known per se, an initial reference color value generator is implemented in order to generate a predetermined set of initial reference input colors R, G, B that is defined here as consisting of two groups of colors:

a first group of colors that are distributed in five ramps: a first ramp in the grey colors, with R=G=B, a second ramp in the red colors with G=B=0, a third ramp in the green colors with R=B=0, a fourth ramp in the blue colors with R=G=0, a fifth ramp going from 0 to $2^M-1$ with M being the bitdepth of the reference display forward transform;

a second group of colors that are distributed on color planes, being a sampling of RGB values with R+G+B= $2^{M-1}$=constant;

Other ramps are possible (for example R=G with B=0) and other color planes are possible (for example at $$R = G = B = \frac{3}{4}2^M$$

without departing from the invention.

A first set of reference input colors is generated from these initial reference input colors according to the predetermined color preferences as follows. By applying the rule of selection defining the predetermined color preferences (see above) to the set of initial reference input colors, all colors of this group that have a probability below the predetermined threshold are deleted from the group. Then, to these colors that remains in the group of initial reference input colors, neighboring colors are added as follows: for each reference input color that remains in this group, neighboring color values are generated in a way that a predetermined neighborhood is covered. In this example, a simple 8-neighborhood is chosen: R+1, G, B/R−1, G, B/R, G+1, B/R, G−1, B/R, G, B+1, R, G, B−1. Finally, remaining reference input colors and neighboring colors form the first set of reference input colors that has been built, as shown above, according to so-called predetermined color preferences. The advantage of adding such neighboring colors is that such neighboring colors have the underlying risk to be reproduced with less or even no color difference.

The first iteration for the optimization of the settings of the reproduction display device can now be launched as follows in five main steps.

In the first step of the first iteration, the reproduction display device is set according to the first set of reproduction device settings $S_{L1}$, $S_{C1}$, $S_{S1}$.

Now, the reproduction display device with its user settings being set is ready for a preliminary characterization step. In a manner known per se, a characterization color value generator is implemented in order to be able to generate a first set of characterization input colors RGB as follows:

$$\left\{ R, G, B \,/\, R = \left\lceil (2^N - 1)\frac{i}{P} \right\rceil; \right.$$
$$\left. G = \left\lceil (2^N - 1)\frac{j}{P} \right\rceil; B = \left\lceil (2^N - 1)\frac{k}{P} \right\rceil; 0 \le i, j, k \le P \right\}$$

with N being the bitdepth of the display input color values and $P \le 2^N - 1$ the resolution of the characterization process and $\lceil \cdot \rceil$ the operator that rounds to the next higher integer. A typical value for P is 8.

The first set of characterization input colors is input into the reproduction display device that reproduces a first set of characterization output colors responsive to this first set of characterization input colors. The characterization output colors are measured in a device-independent color space, as in the CIE XYZ. Using this first set of characterization input colors and this corresponding first set of characterization output colors, a first mathematical model is fitted according to known methods, the model being able, as a co-called reproduction device inverse transform, to transform any output colors into corresponding input colors in a way that that if the output color is one of the color values out of the first set of characterization output values, the transformed input color will be exactly or close to the corresponding input color from the first set of characterization input colors. All other colors in between the colors of the first set of characterization output colors are transformed to colors in between the colors of the first set of characterization input colors. The known methods can be fitting of a parametric curve, splines interpolation, tetrahedral interpolation or any other interpolation method. In this specific implementation, tetrahedral interpolation is used. The mathematical model that is obtained in the described way is called reproduction device inverse transform and characterizes the reproduction display device with its first set of settings $S_L^1$, $S_C^1$, $S_S^1$.

In a variant, the preliminary characterization step can be avoided if, for instance, a reproduction device inverse transform is stored in advance for each possible setting $S_L^q$, $S_C^q$, $S_S^q$ of the reproduction display device, where q is a value of indexation of a setting. It means implicitly that a plurality of preliminary characterization steps have been performed in advance. Such a library of reproduction device inverse transforms can be provided for instance by the manufacturer of the reproduction display device.

Then, in the second step of the first iteration, the reference input colors of the above-defined first set are calibrated into a first set of reproduction input colors using characteristics of the reproduction display device with its first set of reproduction display settings and using characteristics of the reference color device representing the so-called "preferred look". More precisely, these reference input colors are transformed into corresponding reference output colors by the reference display forward transform of the reference color device (see above). These reference output colors are then transformed into a first set of reproduction input colors by the above-defined reproduction display inverse transform characterizing the reproduction display device with its first set of reproduction display settings.

Then, in the third step of the first iteration, the reproduction display device is tested with the first set of reproduction input colors, that are inputted into the reproduction display device that accordingly reproduces a first set of reproduction output colors responsive to these reproduction input colors; these reproduction output colors are measured in a device-independent color space, as in the CIE XYZ.

Then, in the fourth step of the first iteration, the reproduction quality rating value of the first set of reproduction output colors is calculated using the above predetermined reproduction quality rating method. In this case, the first set of reproduction quality rating value that is obtained at the end of this first iteration comprises only one reproduction quality rating value.

At least, in the fifth step of the first iteration, the predetermined quality criterion should be applied. But as this quality criterion is based on a comparison with the quality rating of a previous iteration, and as there is no previous iteration for this first iteration, no quality criterion is applied to the first set of reproduction quality rating value.

A second iteration for the optimization of the settings of the reproduction display device is then launched as follows.

A second set of reproduction display settings $S_L^2$, $S_C^2$, $S_S^2$ is generated using the first setting increment vector such that $S_L^2=S_L^1+\Delta S_L$, $S_C^2=S_C^1+\Delta S_C$, $S_S^2=S_S^1+\Delta S_S$.

A second set of reference input colors is generated by the reference input color generator that is, specifically here for this second iteration, identical to the first set of reference input colors.

Steps 1) to 5) of the first iteration above are performed with this second set of reproduction display settings $S_L^2$, $S_C^2$, $S_S^2$ and with this second set of reference input colors, in order to obtain a second set of reproduction quality rating value, then allowing now, for the fifth step, the actual application of the quality criterion as follows. In this specific embodiment allowing speeding up the process of adjustment of the user settings as disclosed below, the reproduction quality rating value that has been obtained at the end of the previous iteration, i.e. the first iteration, may be recalculated to apply the quality criterion as explained with more details in the third iteration below. More precisely, this quality criterion is defined here as follows:

at the end of this second iteration, if the second set of reproduction display settings $S_L^2$, $S_C^2$, $S_S^2$ that is generated using the first setting increment vector $\Delta S_L$, $\Delta S_C$, $\Delta S_S$ leads to a reproduction quality rating value that is higher than the reproduction quality rating value that is obtained at the end of the previous iteration with the first set of reproduction display settings $S_L^1$, $S_C^1$, $S_S^1$, then, it means that the quality of reproduction can be still improved using a third set of reproduction display settings $S_L^3$, $S_C^3$, $S_S^3$ generated by using again the first setting increment vector $\Delta S_L$, $\Delta S_C$, $\Delta S_S$ and that the quality criterion as defined is not met. $S_L^3=S_L^2+\Delta S_L$, $S_C^3=S_C^2+\Delta S_C$, $S_S^3=S_S^2+\Delta S_S$. Consequently, a new third iteration for the optimization of the settings of the reproduction display device is then launched as described hereinafter.

at the end of this second iteration, if the second set of reproduction display settings $S_L^2$, $S_C^2$, $S_S^2$ leads to a reproduction quality rating value that is lower than or equal to the reproduction quality rating value that is obtained at the end of the previous iteration with the first set of reproduction display settings $S_L^1$, $S_C^1$, $S_S^1$, then, it means that the quality of reproduction cannot be improved along the first setting increment vector $\Delta S_L$, $\Delta S_C$, $\Delta S_S$. Then, it means that the quality of reproduction may tentatively be improved using a third set of reproduction display settings $S'^3_L$, $S'^3_C$, $S'^3_S$ generated by using another, if any, predetermined setting increment vector $\Delta S'_L$, $\Delta S'_C$, $\Delta S'_S$ and that the quality criterion as defined is not met. $S'^3_L=S_L^2+\Delta S'_L$, $S'^3_C=S_C^2+\Delta S'_C$, $S'^3_S=S_S^2+\Delta S'_S$. Consequently, a new third iteration for the optimization of the settings of the reproduction display device is then launched as follows hereinafter.

Globally, according to the comparison between the quality rating values of two successive iterations, either the direction in the settings space is preserved and the new settings are built using the same direction, either another direction in the settings space is tested. Preferably, in the latter case, the change of the user settings of the last iteration is canceled before changing the direction in the settings space. This general known method is called "steepest descent".

A third iteration is then launched based on the third set of reproduction display settings as defined above according to the application of the reproduction quality criterion. Using the reference input color generator, a third set of reference input colors is generated in a specific way explained hereinafter, allowing advantageously rapid enhancement of reproduction quality rating values.

When the third set of reproduction display settings $S_L^3$, $S_C^3$, $S_S^3$ has been generated using the same predetermined setting increment vector $\Delta S_L$, $\Delta S_C$, $\Delta S_S$ as for a previous iteration (see above), the third set of reference input colors is defined as a subset of the previous, i.e. second, set of reference input colors by applying an additional selection rule allowing to remove "useless colors" as follows. This third set of reference input colors is defined as the previous set of reference input colors minus a set of so-called "useless colors" which are defined as follows. Useless colors are those colors where the calculated averaged color difference between a reproduced color and its neighboring reproduced color do not change much or decrease constantly during a series of "smooth" iterations. During smooth iterations, the settings in the settings space change or evolve in a constant or nearly-constant direction. For example, during five smooth iterations, the contrast may be reduced each iteration by 10%. The reduced set of reference input colors that are obtained as the new sets of reference input colors at each new iteration allow advantageously to speed up the process of adjustment of the settings with respect to using all colors including the useless colors. Optionally, if selected colors are available (from the second iteration on), those colors from the second reference input colors are additionally removed that are not close to selected colors according to a predefined distance.

When the third set of reproduction display settings $S'_L{}^3$, $S'_C{}^3$, $S'_S{}^3$ has been generated using a new predetermined setting increment vector $\Delta S'_L$, $\Delta S'_C$, $\Delta S'_S$ (see above), the set of reference input colors that is used for this new iteration is reset to be identical to the first set of reference input colors.

Steps 1) to 5) above are performed with the third set of reproduction display settings and the above-defined third set of reference input colors, in order to obtain a third set of reproduction quality rating value, then allowing the application of the above-defined reproduction quality criterion as follows:

preliminarily, to be able to compare the reproduction quality rating value with that of the preceding iteration, the latter need to be updated; the reproduction quality rating value of the previous iteration which has been previously calculated from the second set of reference input colors is updated by recalculation from the third set of reference input colors. Both reproduction quality rating values of the previous iteration remain based on the second set of reproduction display settings.

at the end of this third iteration, if the third set of reproduction display settings leads to a reproduction quality rating value that is higher than the updated reproduction quality rating value that is obtained at the end of the previous iteration with the second set of reproduction display settings $S_L^2$, $S_C^2$, $S_S^2$, then, it means that the quality of reproduction can be still improved using a fourth set of reproduction display settings $S_L^4$, $S_C^4$, $S_S^4$ generated by using the same setting increment vector as for the generation of the third set of reproduction display settings and that the reproduction quality criterion as defined is not met. Consequently, a new fourth iteration for the optimization of the settings of the reproduction display device is then launched as described previously for the third iteration, mutatis mutandis.

at the end of this third iteration, if the third set of reproduction display settings leads to a reproduction quality rating value that is lower than or equal to the updated reproduction quality rating value that is obtained at the end of the previous iteration with the second set of reproduction display settings $S_L^2$, $S_C^2$, $S_S^2$, then, it means that the quality of reproduction cannot be improved any more along the setting increment vector that has been used for the generation of the third set of reproduction display settings. Then, it means that the quality of reproduction may possibly be improved using a fourth set of reproduction display settings generated by using still another, if any, predetermined setting increment vector and that the reproduction quality criterion as defined is not met. Consequently, a new fourth iteration for the optimization of the settings of the reproduction display device is then launched as described previously for the third iteration, mutatis mutandis. If no other setting increment vector is available in the set of setting increment vectors, then it means that the reproduction quality criterion is met and the process of optimization of the settings of the reproduction display device is ended, no new iteration is launched and the penultimate set of reproduction display device settings which gives the highest reproduction quality rating value is adopted to finally set the reproduction display device.

As long as the reproduction quality rating values increase from one iteration to a following one, new iterations similar to the third iteration are added to the process. As soon as the reproduction quality rating values do not increase and as soon as all setting increment vectors of the set of setting increment vectors have been tested, then the process of optimization of the settings of the reproduction display device is ended, the reproduction quality criterion is considered as met and no new iteration is launched and the penultimate set of reproduction display device settings which gives the highest reproduction quality rating value is adopted to finally set the reproduction display device.

In a variant, a predetermined threshold of increase of the reproduction quality rating value may be added. And, even if the reproduction quality rating value increases from one iteration to a following one, but if this increase is inferior to this threshold, then the process of optimization of the settings of the reproduction display device is ended, the reproduction quality criterion is considered as met and no new iteration is launched and the penultimate set of reproduction display device settings which gives the highest reproduction quality rating value is adopted to finally set the reproduction display device.

Instead of the "steepest descent" method for the incrementation of the settings of the reproduction display device from one iteration to another, other optimization techniques can be used without departing from the invention. For example, the "saturation" settings can be increased if the averaged color differences for saturated colors are insufficient with respect to the averaged color differences of less saturated colors. The color control means may increase the "contrast" settings if the averaged color differences for medium values are insufficient with respect to the averaged color difference values for small and high lightness. The color control means may increase the "luminance" settings if the averaged color differences for low values is insufficient with respect to the averaged color differences for medium and high values. In this variation, several reproduction quality rating methods will then been considered instead of one and the reproduction quality criterion will be based on the following set of reproduction quality rating methods:

averaged color differences for low values;
averaged color differences for medium values;
averaged color differences for high values;
averaged color differences for saturated colors;
averaged color differences for less saturated colors,
those "averaged color differences" being calculated in a similar way as the averaged difference as defined above for the solely reproduction quality rating value provided in the embodiment of the invention previously described.

It will thus be appreciated that those skilled in the art will be able to devise various arrangements that, although not explicitly described or shown herein, embody the present principles and are included within its spirit and scope.

The different steps of the method of adjusting the settings of a reproduction color device according to the invention may be implemented through the use of dedicated hardware, as well as hardware capable of executing software in association with appropriate software. When provided by a processor, these steps may be implemented by a single dedicated processor, by a single shared processor, or by a plurality of individual processors, some of which may be shared.

Although the invention has been described herein with reference to a main embodiment, it is to be understood that the present invention is not limited to this precise embodiment, and that various changes and modifications may be effected therein by one of ordinary skill in the pertinent art without departing from the scope or spirit of the present invention. All such changes and modifications are intended to be included within the scope of the present principles as set forth in the appended claims.

The invention claimed is:

1. A method for adjusting settings of a reproduction color device in order to get the reproduction of at least one image by this reproduction color device according to a predetermined reference color device having reference color characteristics, according to a predetermined color preference adapted to select colors within a predetermined set of colors and defined as a set of at least one rule of selection of colors within said predetermined set of colors comprising a rule of selection defined in relationship with a specific type of reproduction, according to a predetermined reproduction quality rating method adapted to provide a set of at least one reproduction quality rating value representing the quality of reproduction of the at least one image by said reproduction color device, and according to a predetermined reproduction quality criterion applicable to a set of reproduction quality rating values provided by said predetermined reproduction quality rating method, the method comprising:
   generating a first set of reproduction device settings corresponding to color characteristics of this reproduction color device;
   generating a first set of reference input colors by applying the predetermined color preference; and
   launching successive iterations according to the following:
      setting said reproduction color device according to the last set of reproduction device settings that has been generated,
      calibrating the reference input colors of the last set that has been generated into a new set of reproduction input colors, said calibrating being performed according to said reference color characteristics of the predetermined reference color device and according to the color characteristics of the reproduction color device that correspond with said last set of reproduction display settings,
      testing said reproduction color device by inputting said new set of reproduction input colors and by measuring a new set of reproduction output colors generated by said reproduction color device responsive to these reproduction input colors,
      applying said predetermined reproduction quality rating method on said new set of reproduction output colors in order to provide a new set of reproduction quality rating values,
      applying said predetermined reproduction quality criterion on at least the new set of reproduction quality rating values that has been provided such that:
         when the reproduction quality criterion is not met, a new set of reproduction device settings is generated, and another similar iteration is launched, and
         when the reproduction quality criterion is met, the last or the penultimate set of reproduction device settings is used to set said reproduction color device.

2. The method for adjusting the settings of a reproduction color device according to claim 1 wherein, before launching any new iteration, a new set of reference input colors is generated.

3. The method for adjusting the settings of a reproduction color device according to claim 1 wherein:
   said reference color characteristics of the reference color device is a reference device forward transform that is able to transform any reference input color of said reference color device into a reference output color that would be generated by said reference color device responsive to this reference input color,
   said color characteristics of the reproduction color device corresponding to a set of reproduction display settings is a reproduction device inverse transform that is able to transform any reproduction output color of said reproduction color device into a reproduction input color, whereas said reproduction output color would be generated by said reproduction color device responsive to this reproduction input color,
   said calibrating of reference input colors of the last set is performed by applying the reference device forward transform color-characterizing said reference color device to said reference input colors then providing reference output colors, then applying the reproduction device inverse transform color-characterizing said reproduction display device to said reference output colors, then providing said reproduction input colors.

4. The method for adjusting the settings of a reproduction color device according to claim 3 wherein said predetermined reproduction quality rating method provides a reproduction quality rating value inversely proportional to the difference between the set of measured reproduction output colors that is obtained at the end of an iteration and the corresponding set of reference output colors that is obtained though calibrating during said iteration.

5. The method for adjusting the settings of a reproduction color device according to claim 4 wherein said predetermined reproduction quality rating method provides a reproduction quality rating value proportional to the variance of a subset of measured reproduction output colors belonging to the set of measured reproduction output colors.

6. The method according to claim 1 wherein said set of at least one rule of selection of colors comprises a rule of selection defined for selecting color having a probability above a predetermined probability threshold in said at least one image to reproduce.

7. The method for adjusting the settings of a reproduction color device according to claim 1 wherein said predetermined reproduction quality rating method is adapted to provide a set of reproduction quality rating values that is representative of the preservation of contrast, hue and saturation of a set of reproduction output colors provided by the testing of said reproduction color device, or that is representative of the prevention from clipping, color compression, flattening or quantization of a set of reproduction output colors provided by the testing of said reproduction color device.

8. The method for adjusting the settings of a reproduction color device according to claim 1 wherein said predetermined reproduction quality rating method provides a reproduction quality rating value proportional to the variance of a subset of measured reproduction output colors belonging to the set of measured reproduction output colors.

9. The method for adjusting the settings of a reproduction color device according to claim 1 wherein said reproduction quality criterion is defined as being met when the difference between the set of quality rating values that have been provided at the end of a given iteration and the set of quality rating values that have been calculated at the end of a previous iteration is inferior to a predetermined threshold.

10. The method for adjusting the settings of a reproduction color device according to claim 1 wherein, when said specific type of reproduction concerns low-cost reproduction display devices said rule of selection defined in relationship with said specific type is adapted to select mid-tones, when said specific type of reproduction concerns cinema projection, said rule of selection defined in relationship with said specific type is adapted to select dark tones.

11. A system for adjusting settings of a reproduction color device, the system comprising:
a reproduction color device;
a predetermined reference color device having reference color characteristics;
a memory; and
a processor;
wherein the processor is configured to:
select colors within a predetermined set of colors according to a predetermined color preference by using a set of at least one rule of selection of colors within said predetermined set of colors comprising a rule of selection defined in relationship with a specific type of reproduction;
provide a set of at least one reproduction quality rating value representing the quality of reproduction of the at least one image by the reproduction color device according to a predetermined reproduction quality rating method; and
define a predetermined reproduction quality criterion applicable to a set of reproduction quality rating values provided by the predetermined reproduction quality rating method;
wherein the processor is further configured to generate a first set of reproduction device settings corresponding to color characteristics of the reproduction color device and generate a first set of reference input colors by applying the predetermined color preference in the reproduction color device, and
the processor is configured to iteratively:
set the reproduction color device according to the last set of reproduction device settings that has been generated;
calibrate the reference input colors of the last set that has been generated into a new set of reproduction input colors, the calibrating being performed according to the reference color characteristics of the predetermined reference color device and according to the color characteristics of the reproduction color device that has been set correspond with the last set of reproduction display settings;
test the reproduction color device by inputting the new set of reproduction input colors and by measuring a new set of reproduction output colors generated by the reproduction color device responsive to these reproduction input colors;
apply the predetermined reproduction quality rating method on the new set of reproduction output colors in order to provide a new set of reproduction quality rating values,
apply the predetermined reproduction quality criterion on at least the new set of reproduction quality rating values that has been provided such that:
when the reproduction quality criterion is not met, generate a new set of reproduction device settings, and launch another similar iteration, and,
when the reproduction quality criterion is met, use the last or the penultimate set of reproduction device settings to set the reproduction color device.

12. The system according to claim 11 wherein, before the processor performs any new iteration, a new set of reference input colors is generated.

13. The system according to claim 11 wherein:
said reference color characteristics of the reference color device is a reference device forward transform that is able to transform any reference input color of said reference color device into a reference output color that would be generated by said reference color device responsive to this reference input color,
said color characteristics of the reproduction color device corresponding to a set of reproduction display settings is a reproduction device inverse transform that is able to transform any reproduction output color of said reproduction color device into a reproduction input color, whereas said reproduction output color would be generated by said reproduction color device responsive to this reproduction input color,
said calibrating of reference input colors of the last set is performed by applying the reference device forward transform color-characterizing said reference color device to said reference input colors then providing reference output colors, then applying the reproduction device inverse transform color-characterizing said reproduction display device to said reference output colors, then providing said reproduction input colors.

14. The system according to claim 13 wherein said predetermined reproduction quality rating method provides a reproduction quality rating value inversely proportional to the difference between the set of measured reproduction output colors that is obtained at the end of an iteration and the corresponding set of reference output colors that is obtained though calibrating during said iteration.

15. The system according to claim 11 wherein said set of at least one rule of selection of colors comprises a rule of selection defined for selecting color having a probability above a predetermined probability threshold in said at least one image to reproduce.

16. The system according to claim 11 wherein said predetermined reproduction quality rating method is adapted to provide a set of reproduction quality rating values that is representative of the preservation of contrast, hue and saturation of a set of reproduction output colors provided by the testing of said reproduction color device, or that is representative of the prevention from clipping, color compression, flattening or quantization of a set of reproduction output colors provided by the testing of said reproduction color device.

17. The system according to claim 11 wherein said predetermined reproduction quality rating method provides a reproduction quality rating value proportional to the variance of a subset of measured reproduction output colors belonging to the set of measured reproduction output colors.

18. The system according to claim 11 wherein said reproduction quality criterion is defined as being met when the difference between the set of quality rating values that have been provided at the end of a given iteration and the set of quality rating values that have been calculated at the end of a previous iteration is inferior to a predetermined threshold.

* * * * *